Dec. 12, 1933. E. A. McNEIL Re. 19,024

WEIGHT OPERATED SWITCH

Original Filed June 20, 1927 2 Sheets-Sheet 1

Everett A. McNeil
INVENTOR

BY Victor J. Evans
ATTORNEY

WITNESS: John Donovan

Dec. 12, 1933. E. A. McNEIL Re. 19,024

WEIGHT OPERATED SWITCH

Original Filed June 20, 1927 2 Sheets-Sheet 2

Everett A. McNeil
INVENTOR

BY Victor J. Evans
ATTORNEY

WITNESS: John Donovan

Reissued Dec. 12, 1933

Re. 19,024

UNITED STATES PATENT OFFICE 19,024

WEIGHT OPERATED SWITCH

Everett A. McNeil, Kenosha, Wis.

Original No. 1,737,471, dated November 26, 1929, Serial No. 200,124, June 20, 1927. Application for reissue November 12, 1931. Serial No. 574,664

3 Claims. (Cl. 200—85)

This invention relates to certain novel improvements in coal handling apparatus. It is customary in coal yards from which coal is delivered to retail consumers to store the various types of coal and analogous fuel in so-called silos or storage bins and a bucket conveyor is arranged so as to transport the coal to the silos. My invention is particularly related to such an arrangement and consists of certain novel improvements which will be described in detail hereinafter.

In coal yards where a plurality of silos are provided in which coal is adapted to be stored, these silos are usually arranged in a pre-determined order and a track is positioned so as to extend along the upper side of these silos. A suitable car is adapted to travel on these tracks and a so-called bucket conveyor is carried by this track which is so arranged that it may be lowered and raised into and out of said silos. This bucket conveyor is carried by a suitable cable and it is among the objects of my invention to arrange this scale in such a way that said cable may be maintained in a taut condition.

A further object of the invention is to provide a cut off device in such apparatus as has been described whereby movement of the bucket may be terminated when it reaches the level of the coal in a silo.

A further object of the invention is to arrange such apparatus in a manner that it may be made to function in a more rapid manner and thus save time.

A further object of my invention is the provision of apparatus whereby when the weight of the loaded conveyor bucket is supported upon the dumped material in the bin, or auxiliary supported in any manner, the further lowering of the bucket onto the dumped material is stopped and breakage of the material is prevented while the lading from the bucket is discharged. In this manner breakage of coal or other fragile material being handled by the conveyor bucket is prevented, because it has been the practice heretofore to allow the bucket to jam down on top of the material in the bin resulting in a crushing of a great deal of it, or else the lading in the bucket is discharged from a fairly high distance above the material in the storage bin which results also in breakage of the material.

A still further object of the invention is to arrange such apparatus in a manner that the wear on the various parts may be reduced to a minimum and thus reduce the cost of maintenance of the apparatus.

Other objects will appear hereinafter.

The invention consists in the novel combination and arrangement of parts to be hereinafter described and claimed.

The invention will be best understood by reference to the accompanying drawings, showing the preferred form of construction and in which.

Figure 1:
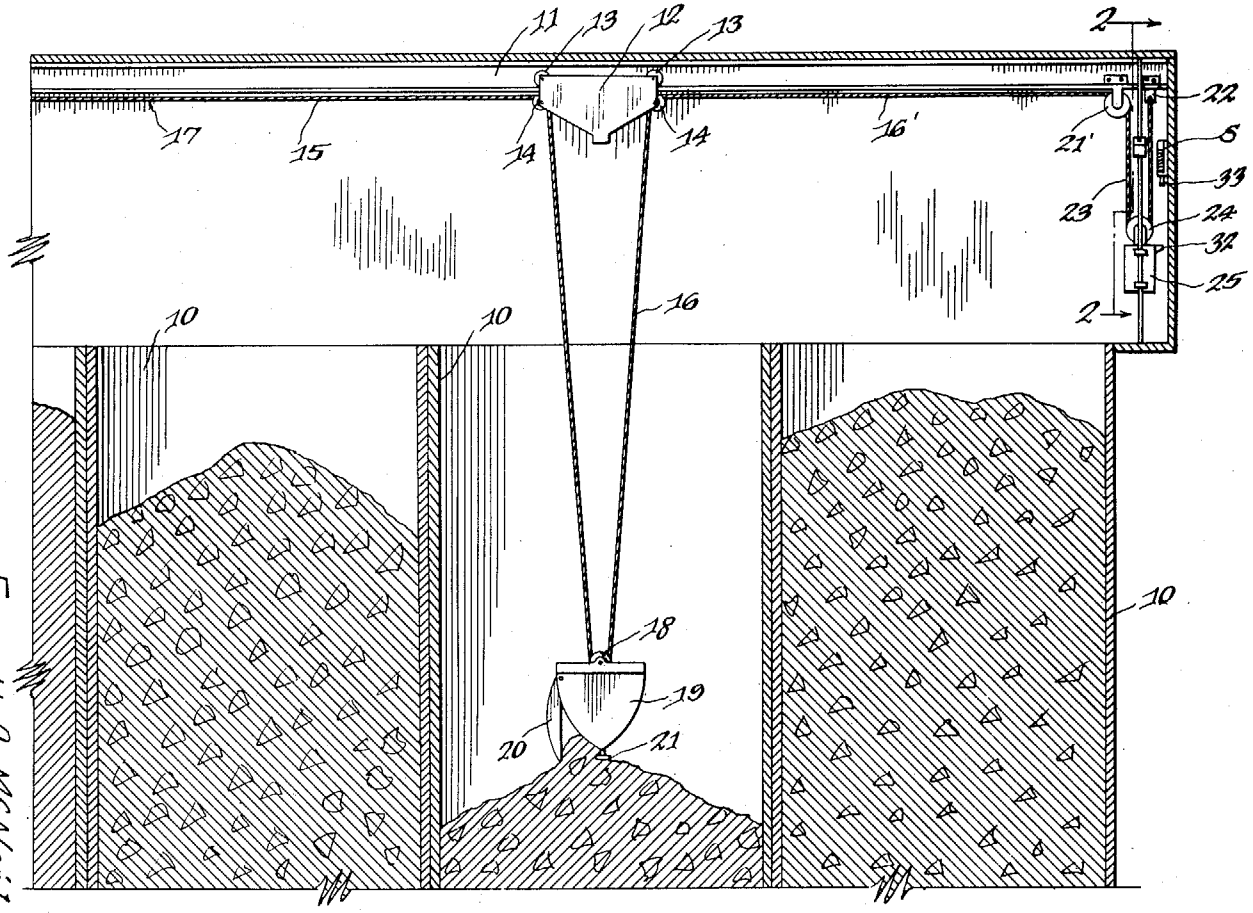
Figure 1 is a longitudinal sectional view through a plurality of silos showing the track arrangement thereabove as well as the car and the bucket conveyor carried thereby.

Referring to the drawings wherein a preferred embodiment of my invention is illustrated, it may be seen that a plurality of silos 10 are provided which are disposed side by side. Arranged above the silos 10 and supported in any approved manner, is a track 11 which in the present instance is in the form of a so-called I-beam. A car 12 having suitable wheels 13 thereon is adapted to travel along the I-beam 11 and a cable arrangement, not shown, is adapted to move said car along said I-beam. The cables which are adapted to move the car are directed to a control house wherein suitable power mechanisms are provided as well as the control means therefor.

Mounted on the car 12 are sheaves 14 which are arranged in the manner best shown in Figure 1. Directed around the sheaves is a cable 15 which has a bight portion 16 disposed between the sheaves 14. The end 16′ of the cable 15 is adapted to be fixedly secured in a manner to be described hereinafter and the end 17 of the cable 15 is directed to a suitable winding drum located in the heretofore mentioned control house wherein means are provided for actuating the winding drum and also where means are provided for controlling the action of said operating means. A sheave 18 is mounted in the bight portion of the cable 15 and a suitable bucket conveyor 19 is carried by the sheave 18. A door or lid 20 is provided on the bucket conveyor 19 which is adapted to be automatically opened by a suitable arrangement such as that generally indicated as 21 in the drawings, this automatic opening apparatus being caused to function when it strikes the top of the coal in the silo.

As the end 17 of the cable 15 is wound on the drum, which is not shown in the drawings, it is apparent that the magnitude of the bight portion 16 will be reduced and this will cause the bucket conveyor 19 to be raised, this action taking place due to the fact that the end 16′ of the cable 15 is fixedly secured and therefore when the end 17 is wound on the drum, the cable will be drawn from the bight portion 16. It is apparent that when cable is unwound from the winding drum, the magnitude of the bight portion will increase and will permit the bucket conveyor 19 to be lowered down into one of the silos 10. When the opening device 21 strikes the top of the coal contained in said silo, the lid 20 will be opened which will permit the coal to run out of the bucket conveyor 19 into the silo 10. It is apparent that if the operator of the device does not stop the unwinding movement of the drum, excess cable will be provided in the bight portion 16. When the winding action of the drum is again brought into action, this slack or excess of cable in the bight portion will be no load thereon, the slack cable 15 tends to whip and strike the various parts of the mechanism which is detrimental to the life of the cable and this causes frequent breakage thereof and increases the cost of maintenance of the apparatus. However, as soon as the slack portion is wound on the drum, the mechanism will function in the manner described to raise the bucket 19 which may then be transported to any desired point where the bucket is lowered and dumped in the manner described, and if again the operator does not stop the drum at the proper point, the cable 15 will again become slack.

To obviate the foregoing condition, I provide the following structure. On the I-beam 11 I provide a sheave 21′ around which the end 16′ of the cable 15 is directed. The end 16′ of the cable 15 is then fixedly secured to a suitable clamp 22 that is provided on the I-beam 11 and a bight portion 23 is provided in the cable at this point. A sheave 24 is mounted in this bight portion and a weight 25 is carried by this sheave. It is to be understood that if desired, the end 16′ of the cable 15 might be secured directly to the weight 25 and still not depart from the purview of my invention. I will, however, describe herein the structure as embodying a bight portion as illustrated in the drawings. A suitable pair of aligned rods are supported from the I-beam 11, these rods being indicated in the drawings by 26 and 27. Bearing portions 28 are provided on the weight 25 that are adapted to engage the rods 26 and 27 in such a way that the weight 25 will be slidable thereon. Stops 29 and 30 are mounted on the rods 26 and 27 and limit the upward movement of the weight 25 by the engagement of the bearing portions 28 with the stops 29 and 30. Set screws 31 are provided in the stops 29 and 30 so as to permit said stops to be moved along the rods in order to vary the stopping point thereon.

Figure 2:
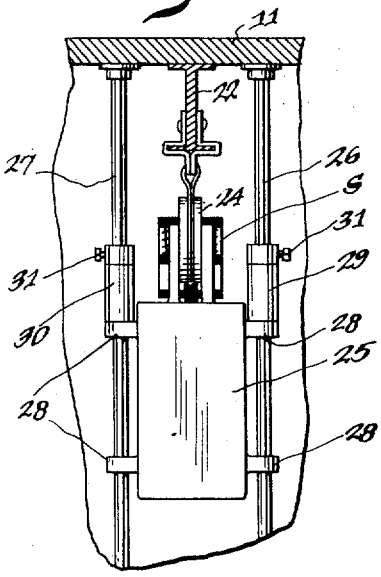
Figure 2 is a detail view taken substantially in the plane of the line 2—2 on Figure 1.
Figure 3:
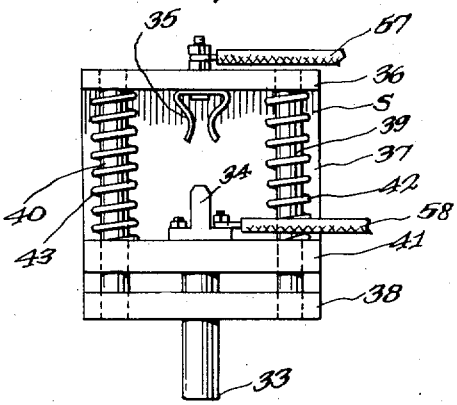
Figure 3 is a detail view of a switch employed in the device.

As can be seen by referring to Fig. 1, a switch mechanism generally indicated as S, is supported by one of the walls of the housing of the apparatus and a lug 32 is provided on the weight 25 which is adapted to engage the projection 33 of said switch S. When the weight is in this upward position as illustrated in Figure 2, the lug 32 will engage the projections 33 and will force the contact 34 upwardly into engagement with the clip 35. The clip 35 is mounted on the insulating strip 36 that is fixedly secured to the back plate 37 of the switch mechanism. An insulating strip 38 is provided on the back plate 37 and has an opening therein through which the projection 33 protrudes. The rods 39 and 40 are carried by the strips 36 and 38 and an insulating strip 41 is slidably mounted thereon on which the contact 34 is carried and to which the projection 33 is secured. Suitable coil springs 42 and 43 are disposed around the rods 39 and 40 respectively and tend to force the contact 34 out of engagement with the clip 35. The projection 33 is slidably mounted in the strip 38 and therefore when the lug 32 engages said projection 33 it will force said projection 33, strip 41 and contact 34 upwardly, said strip 41 sliding along the rods 39 and 40 so as to compress the coil springs 42 and 43. In this manner the circuit to the motor operating the drum on which the cable 15 is adapted to be wound, is closed.

As long as the cable 15 remains taut, the weight 25 will be held in the position indicated in Figure 2, and thus the contact 34 will be held in engagement with the clip 35. However, as soon as the bucket 19 strikes the top of the fuel, as illustrated in Figure 1, the unwinding action of the cable 15 will continue and thus slack will be created in the cable 15 and this slack will be automatically compensated for by the weight 25 which will fall away from the position indicated in Figure 2 and this will open the circuit between the contact 34 and the clip 35 which will break the circuit to the motor operating the drum from which the cable 15 is being unwound. Any over-run on the part of the drum which will create additional slack will be compensated for by the weight 25. It is to be understood that the weight 25 will be less than the weight of the bucket 19 when empty in order that the said weight will be held in the position illustrated in Figure 2, as long as said bucket is suspended in the bight portion 16. It is apparent that the slightest slack in the cable 15 will be taken up by the weight 25.

Figure 4:
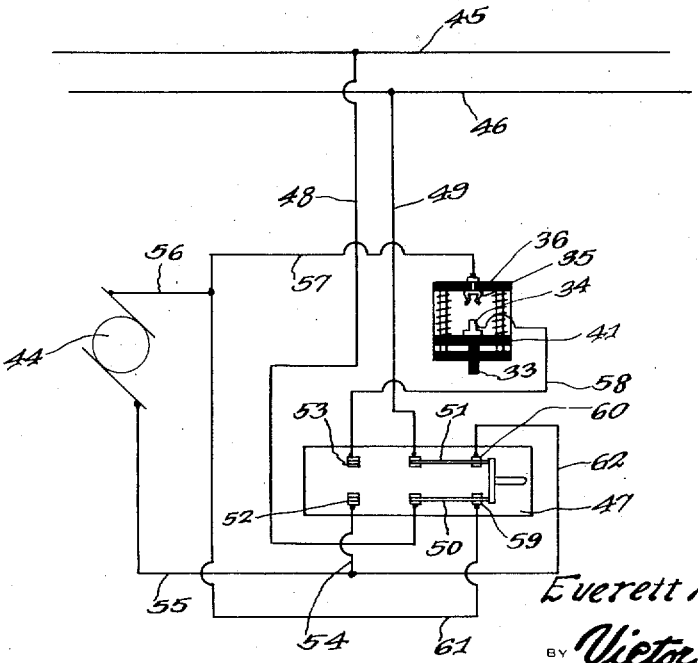
Figure 4 is a schematic view of the electrical connections used to carry out the illustrated embodiment of my invention.

As stated, the contacts 34 and 35 are in the circuit which supplies current to the motor which operates the drum on which the cable 15 is adapted to be wound. In Figure 4 this circuit is illustrated schematically and the motor is generally indicated by 44. Suitable conductors 45 and 46 are provided that are adapted to be connected to a suitable source of power. A so-called double-throw switch 47 is provided and conductors 48 and 49 are adapted to connect the conductors 45 and 46 to the blades 50 and 51 of said double-throw switch. When the blades 50 and 51 are in engagement with the contacts 52 and 53 of the said switch, current flows from the conductor 45 through conductor 48 to the blade 50, the contact 52, through conductor 54, to conductor 55, to the motor 44, thence through conductor 56, conductor 57, clip 35, contact 34, conductor 58, to contact 53, and thence through the blade 51, and conductor 49, to conductor 46. It is apparent that as soon as the circuit is broken between the clip 35 and the contact 34 the circuit to the motor will be interrupted. Thus the action of the drum on which the cable is mounted will be stopped. However, when the blades 50 and 51 are thrown into engagement with the contacts 59 and 60 of the double-throw switch, the current will flow through the conductor 48, blade 50, contact 59, conductor 61, to conductor 56, through the motor 44, conductors 55 and 62, to contact 60, thence to blade 51, conductor 49, to conductor 46, and thus the drum on which the cable 15 is adapted to be wound will be caused to puncture. It is apparent that this connection is opposite to the connection in which the contact 34 and the clip 35 are employed and therefore the drum will be caused to operate in the opposite direction from that in which it will operate when said contact 34 and clip 35 are employed.

The contact 34 and clip 35 are employed when the bucket is moving downwardly and therefore when the double throw switch is caused to contact with the contacts 59 and 60, the bucket 19 will be raised.

It is apparent from the foregoing that I have provided a construction such that the cable will be maintained in a taut condition at all times and in which the circuit will be automatically broken at the proper time and thus the operation of the device is rendered automatic. Inasmuch as the cable 15 will be maintained taut at all times, no slack will occur in the cable and therefore the detrimental whipping heretofore referred to will be obviated and thus the life of the cable will be prolonged.

It will also be understood that when the bucket comes in contact with the discharged lading it will be partially supported thereon, and while the hoisting cable will remain taut at the same time a very slight slackness in the cable will result so that the counterweight drops down, breaking the electrical contact to the hoisting mechanism and preventing further lowering of the bucket into the discharge bin. In this manner the bucket is held in a vertical position partially suspended upon the lading in the bin, and inasmuch as the bucket has been tripped the lading will flow out of the bucket in a gentle manner without breakage and without the jamming of the bucket onto the pile of lading in the bin.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a device of the class described, a supporting structure, guide rods in said supporting structure, a weight member slidably mounted on said guide rods, means for moving said weight member relative to said guide rods, said weight member having a lug provided thereon, a bracket member mounted on said supporting structure, guide members in said bracket member, a plate adapted for movement over said guiding members, a fixed contact carried by one of said bracket members, spring members adapted to act on said plate to urge said plate away from said contact member, a contact member on said plate adapted to engage said first named contact member, a rod member extending through a portion of said bracket member and fixed to said plate adapted to lie in the path of movement of said lug on said weight member whereby said lug may engage said rod member to move said plate member against said springs to bring said contacts into circuit closing relation.

2. In a device of the class described, a supporting structure, elongated guide means in said supporting structure, a weight member slidably mounted on said elongated guide means, means for moving said weight member relative to said elongated guide means, a bracket member mounted on said supporting structure, guiding members in said bracket member, a plate adapted for movement over said guiding members, a fixed contact carried by said bracket members, spring members adapted to act on said plate to urge said plate away from said contact member, and a contact member on said plate adapted to engage said first named contact member, said plate having a portion extending into the path of a portion of said weight member whereby said weight member may engage said plate portion to move said plate member against said springs to bring said contacts into circuit closing relation.

3. In a device of the class described, a supporting structure, elongated guide means in said supporting structure, a weight member slidably mounted on said elongated guide means, means for moving said weight member relative to said elongated guide means, a bracket member mounted on said supporting structure, guiding means in said bracket member, a plate adapted for movement over said guiding members, a fixed contact carried by said bracket members, spring members adapted to act on said plate to urge said plate away from said contact member, and a contact member on said plate adapted to engage said first named contact member, said plate having a portion extending into the path of a portion of said weight member whereby said weight member may engage said plate portion to move said plate member against said springs to bring said contacts into circuit closing relation, said elongated guide means being several times longer than said guiding members in said bracket member.

EVERETT A. McNEIL.